(12) United States Patent
Böning et al.

(10) Patent No.: US 8,991,174 B2
(45) Date of Patent: Mar. 31, 2015

(54) TURBINE FOR AN EXHAUST TURBOCHARGER, EXHAUST TURBOCHARGER, MOTOR VEHICLE AND METHOD FOR OPERATING AN EXHAUST TURBOCHARGER

(75) Inventors: Ralf Böning, Reiffelbach (DE); Roland Herfurth, Regensburg (DE); Achim Koch, Tegernheim (DE); Christoph Sparrer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 362 days.

(21) Appl. No.: 13/503,104

(22) PCT Filed: Oct. 4, 2010

(86) PCT No.: PCT/EP2010/064721
§ 371 (c)(1),
(2), (4) Date: Jun. 28, 2012

(87) PCT Pub. No.: WO2011/047949
PCT Pub. Date: Apr. 28, 2011

(65) Prior Publication Data
US 2012/0255297 A1 Oct. 11, 2012

(30) Foreign Application Priority Data
Oct. 20, 2009 (DE) .......................... 10 2009 049 993

(51) Int. Cl.
*F02D 23/00* (2006.01)
*F02B 33/44* (2006.01)
(Continued)

(52) U.S. Cl.
CPC ............... *F02B 37/22* (2013.01); *F02B 37/183* (2013.01); *F16K 11/052* (2013.01); *F16K 1/222* (2013.01); *F16K 1/223* (2013.01); *Y02T 10/144* (2013.01)
USPC ............ 60/602; 60/598; 60/605.1; 123/559.1

(58) Field of Classification Search
USPC ....................... 60/598, 602, 605.1; 123/559.1
See application file for complete search history.

(56) References Cited

U.S. PATENT DOCUMENTS 1,482,413 A 2/1924 Ryder
3,559,397 A * 2/1971 Navarro .......................... 60/602
(Continued)

FOREIGN PATENT DOCUMENTS

DE 198 33 619 A1 1/2000
DE 198 53 391 A1 5/2000
(Continued)

OTHER PUBLICATIONS

German Patent and Trademark Office, Office Action Dated Nov. 12, 2010.

*Primary Examiner* — Thomas Denion
*Assistant Examiner* — Jessica Kebea
(74) *Attorney, Agent, or Firm* — Laurence A. Greenberg; Werner H. Stemer; Ralph E. Locher

(57) ABSTRACT

A turbine for an exhaust turbocharger, in particular for a motor vehicle, has a turbine flap which controls an exhaust volume flowing through the turbine. A wastegate valve directs exhaust past the turbine and a wastegate flap controls an exhaust volume flowing through the wastegate valve. We also provide for an exhaust turbocharger, a motor vehicle having such an exhaust turbocharger, and for a method for operating such an exhaust turbocharger.

13 Claims, 6 Drawing Sheets

(51) Int. Cl.
*F02B 33/00* (2006.01)
*F02B 37/00* (2006.01)
*F02B 37/18* (2006.01)
*F02B 37/22* (2006.01)
*F16K 11/052* (2006.01)
*F16K 1/22* (2006.01)

(56) References Cited

U.S. PATENT DOCUMENTS

| | | | |
|---|---|---|---|
| 4,404,804 A | 9/1983 | Tadokoro et al. | |
| 4,745,752 A * | 5/1988 | Suzuki | 60/602 |
| 5,046,317 A * | 9/1991 | Satokawa | 60/602 |
| 5,423,349 A | 6/1995 | Wicks et al. | |
| 5,427,141 A | 6/1995 | Ohtsubo | |
| 5,996,348 A * | 12/1999 | Watkins | 60/602 |
| 6,000,222 A * | 12/1999 | Regnier | 60/605.2 |
| 6,543,228 B2 * | 4/2003 | Deacon | 60/602 |
| 6,981,375 B2 | 1/2006 | Sisken et al. | |
| 7,637,106 B2 * | 12/2009 | Hertweck et al. | 60/602 |
| 8,196,403 B2 * | 6/2012 | Hittle et al. | 60/602 |
| 8,695,338 B2 * | 4/2014 | Sato et al. | 60/602 |
| 2003/0051759 A1 | 3/2003 | Schmidt et al. | |
| 2004/0244373 A1 | 12/2004 | Frankenstein et al. | |
| 2005/0056017 A1 | 3/2005 | Sisken et al. | |
| 2005/0086936 A1 * | 4/2005 | Bucknell et al. | 60/602 |
| 2007/0089413 A1 * | 4/2007 | Green et al. | 60/600 |
| 2008/0098733 A1 * | 5/2008 | Dickerson | 60/602 |
| 2010/0024414 A1 * | 2/2010 | Hittle et al. | 60/602 |
| 2011/0000209 A1 | 1/2011 | Boening et al. | |
| 2012/0222419 A1 * | 9/2012 | Hittle et al. | 60/605.1 |
| 2013/0014502 A1 * | 1/2013 | Sato | 60/602 |

FOREIGN PATENT DOCUMENTS

| | | |
|---|---|---|
| DE | 100 53 850 A1 | 5/2002 |
| DE | 10 2004 041 166 A1 | 4/2005 |
| DE | 102005051305 A1 | 5/2007 |
| DE | 10 2006 060 907 A1 | 6/2008 |
| DE | 10 2008 011 416 A1 | 9/2009 |
| EP | 0631073 A1 | 12/1994 |
| EP | 0 702 175 A1 | 3/1996 |
| EP | 1 152 133 A2 | 11/2001 |
| EP | 1 396 619 A1 | 3/2004 |
| EP | 1 939 427 A2 | 7/2008 |
| GB | 2 151 700 A | 7/1985 |
| JP | 2003-254051 A | 9/2003 |
| JP | 2004-218554 A | 8/2004 |
| JP | 2004-332686 A | 11/2004 |
| WO | 03/044327 A1 | 5/2003 |

\* cited by examiner

TURBINE FOR AN EXHAUST TURBOCHARGER, EXHAUST TURBOCHARGER, MOTOR VEHICLE AND METHOD FOR OPERATING AN EXHAUST TURBOCHARGER

BACKGROUND OF THE INVENTION

Field of the Invention

The present invention relates to a turbine for an exhaust turbocharger, to an exhaust turbocharger, to a motor vehicle and to a method for operating an exhaust turbocharger of this kind.

DE 10 2004 041 166 A1 describes the known construction of an exhaust turbocharger for a motor vehicle, which essentially comprises a radial turbine and a radial compressor, which is arranged in the intake section of the engine and is coupled to the turbine rotor of the radial turbine for conjoint rotation by a turbocharger shaft. During operation, the exhaust gas flow, which has a high kinetic and thermal energy, drives the turbine rotor, which imparts rotation to the compressor impeller through the coupling to the turbocharger shaft. The radial compressor draws in air and compresses it, with the result that there is a correspondingly greater fresh air pressure and hence more oxygen available in the intake section of the engine than with a conventional naturally aspirated engine. There is thus an increase in the mean engine pressure and hence in the engine torque, leading to a higher power output from the engine.

The emissions which are produced by an internal combustion engine in a motor vehicle are measured by a predefined procedure. For this purpose, a certain driving cycle (New European Driving Cycle NEDC) is performed on a roller test bed, and the exhaust gases produced are collected at the exhaust of the internal combustion engine, e.g. in a collecting container in the form of a plastic bag. After the driving cycle has been performed, a predetermined quantity of carbon monoxide, hydrocarbons and nitrogen oxides must not be exceeded in the volume of exhaust gas collected. One boundary condition which must be respected in this measuring operation is, for example, that the internal combustion engine must not have been in operation immediately before the measuring operation, i.e. the driving cycle is started with a cold internal combustion engine. In normal driving operation, i.e. with a catalytic converter which is warm from operation, the internal combustion engine produces virtually none of the emissions mentioned above. These are converted in the catalytic converter. However, the catalytic converter operates effectively only above a certain operating temperature. Before this temperature is reached, the pollutants enter the collecting container at the exhaust. The earlier the catalytic converter reaches its operating temperature, the earlier these pollutants are catalyzed and the less pollutants are produced by the internal combustion engine in the NEDC test. To ensure that the operating temperature of the catalytic converter is reached as quickly as possible, said converter is therefore preferably arranged close to the engine, preferably directly behind the exhaust manifold.

When an exhaust turbocharger is used, it is no longer possible for the catalytic converter to be mounted close to the internal combustion engine since, in this case, the radial turbine of the exhaust turbocharger is fitted between the internal combustion engine and the catalytic converter. The structurally required large surface areas of the turbine scroll and of the turbine rotor and the required relatively long pipes mean that the exhaust gas loses both heat and kinetic energy as it flows through the turbine housing. When a "waste gate valve" is used during the starting phase to direct some of the exhaust gases past the turbine, the effect described above can admittedly be reduced, but naturally some of the mass flow of exhaust gas takes the path via the turbine, even when such a waste gate valve is used. This increases the time which elapses before the catalytic converter has reached the required operating temperature thereof. As a result, more pollutants are detected in the NEDC test in comparison with a comparable internal combustion engine without an exhaust turbocharger.

The aim is of course to avoid this.

BRIEF SUMMARY OF THE INVENTION

Given this background, it is the underlying object of the present invention to provide an improved turbine for an exhaust turbocharger.

According to the invention, this object is achieved by a turbine having the features as claimed and/or by an exhaust turbocharger having the features as claimed and/or by a motor vehicle as claimed and/or by a method as claimed.

Accordingly, the following are provided:

A turbine for an exhaust turbocharger, in particular for a motor vehicle, having a turbine flap, which controls a quantity of exhaust gas flowing through the turbine, having a waste gate valve, which directs exhaust gas past the turbine and having a waste gate flap, which controls a quantity of exhaust gas flowing through the waste gate valve.

An exhaust turbocharger, in particular for a motor vehicle, having a turbine according to the invention, which has: a turbine rotor arranged in a turbine housing, a compressor having a compressor housing, a compressor impeller arranged in the compressor housing, and a turbocharger shaft, which connects the compressor impeller to the turbine rotor for conjoint rotation.

A motor vehicle having an exhaust turbocharger of this kind.

A method for operating an exhaust turbocharger of this kind which has a turbine according to the invention, having a first operating mode, in which the turbine flap is completely closed and in which the waste gate flap is completely opened, with the result that the entire quantity of exhaust gas flows through the waste gate valve.

The concept underlying the present invention consists then inter alia in completely closing the turbine of the exhaust turbocharger during the starting phase of an internal combustion engine. This is achieved through the interplay between the waste gate flap and the turbine flap. This ensures that, during the starting phase of the internal combustion engine, the entire quantity of exhaust gas is passed around the turbine through the waste gate valve and does not lose heat in flowing through the turbine. With the turbine according to the invention, it is thus possible to achieve the operating temperature required for efficient operation of the catalytic converter very quickly.

Advantageous embodiments and developments of the present invention will emerge from the additional dependent claims and from the description when taken in conjunction with the figures of the drawing.

In a preferred embodiment of the present invention, the turbine has a turbine housing, wherein the waste gate valve is provided as an aperture in the turbine housing and wherein the turbine flap and the waste gate flap are arranged in the turbine housing. This enables the turbine according to the invention to be configured in a compact manner, thereby reducing the space requirement and weight of the turbine according to the invention.

In a typical embodiment of the present invention, the turbine flap is arranged at a turbine outlet. This arrangement ensures that the mass flow of exhaust gas flowing into the turbine is not hindered by the turbine flap in entering the turbine. This makes it possible to avoid an impairment of efficiency.

In a particularly preferred embodiment of the present invention, the turbine flap and/or the waste gate flap have rounded valve elements. This ensures reliable sealing of the turbine outlet and/or of the waste gate valve and minimizes leaks of exhaust gas.

In an equally preferred embodiment of the present invention, the turbine flap and the waste gate flap are arranged on a common shaft, in particular a waste gate spindle, and are connected thereto for conjoint rotation. This makes it possible to control both the turbine flap and the waste gate flap jointly, thereby making it possible to dispense with an additional actuating means for the turbine flap. As a result, the number of components, the installation space and the weight of the turbine according to the invention are reduced, thereby reducing the production costs of the turbine and significantly widening the area of application owing to the reduced weight and the reduced installation space requirement.

In another preferred embodiment of the present invention, an actuating means is provided for rotating the shaft. The actuating means ensures reliable positioning of the shaft in the desired position and, as a result, the desired degree of opening of the turbine and of the waste gate valve can be set, thus ensuring the functionality of the turbine.

In an equally preferred embodiment of the present invention, the turbine flap and the waste gate flap are arranged offset relative to one another in a longitudinal direction and in a circumferential direction of the shaft. This ensures that, at defined angular positions of the shaft, the turbine outlet is completely closed while the waste gate valve is completely opened, or that the turbine outlet is completely opened while the waste gate valve is completely closed.

In another preferred embodiment of the present invention, the shaft can be rotated into a first position, in which the turbine outlet is completely closed and in which the waste gate valve is completely opened. This ensures that the entire quantity of exhaust gas flows through the waste gate valve and, as a result, the catalytic converter of an internal combustion engine reaches its operating temperature very quickly. This ensures that the pollutant emissions during an exhaust gas test cycle are as low as possible.

In an equally preferred embodiment of the present invention, the shaft can be rotated into a second position, in which the turbine outlet is at least partially opened and in which the waste gate valve is likewise at least partially opened. This ensures that, during full load operation of the internal combustion engine for example, i.e. at high engine speeds, the entire quantity of exhaust gas does not flow through the turbine, something which would cause the rotational speed of the turbine to rise to too high a level.

In an equally preferred embodiment of the present invention, the shaft can be rotated into an end position, in which the turbine outlet is completely opened and in which the waste gate valve is completely closed, wherein the waste gate flap is pressed against a valve seat of the waste gate valve to prevent leaks of exhaust gas in the end position. This is a reliable way of preventing exhaust gas from flowing through the waste gate valve in full load operation of the internal combustion engine at low engine speeds, for example. As a result, the required turbine power is already available at low engine speeds and full load of the internal combustion engine. Moreover, the acceleration behavior of a motor vehicle having an internal combustion engine of this kind is significantly improved while largely avoiding "turbo lag", for example.

In a typical embodiment of the present invention, a second operating mode is provided, in which the turbine flap and the waste gate flap are at least partially opened, with the result that the quantity of exhaust gas flows partially through the turbine and partially through the waste gate valve. As already explained, this ensures that, in full load operation of the internal combustion engine for example, the entire quantity of exhaust gas does not flow through the turbine, which would cause an excessive and undesirable increase in the rotational speed of the turbine.

In another preferred embodiment of the present invention, a third operating mode is provided, in which the turbine flap is completely opened and in which the waste gate flap is completely closed, with the result that the entire quantity of exhaust gas flows through the turbine. This is a reliable way of preventing exhaust gas from flowing through the waste gate valve in full load operation of the internal combustion engine at low engine speeds, for example. As a result, the required turbine power is already available at low engine speeds and full load of the internal combustion engine. The acceleration behavior of a motor vehicle having an internal combustion engine of this kind is significantly improved while largely avoiding "turbo lag", for example.

The above embodiments can be combined in any desired manner insofar as this is reasonable.

The present invention is explained in greater detail below with reference to the illustrative embodiments given in the schematic figures of the drawing, in which:

DESCRIPTION OF THE INVENTION

Figure 1:
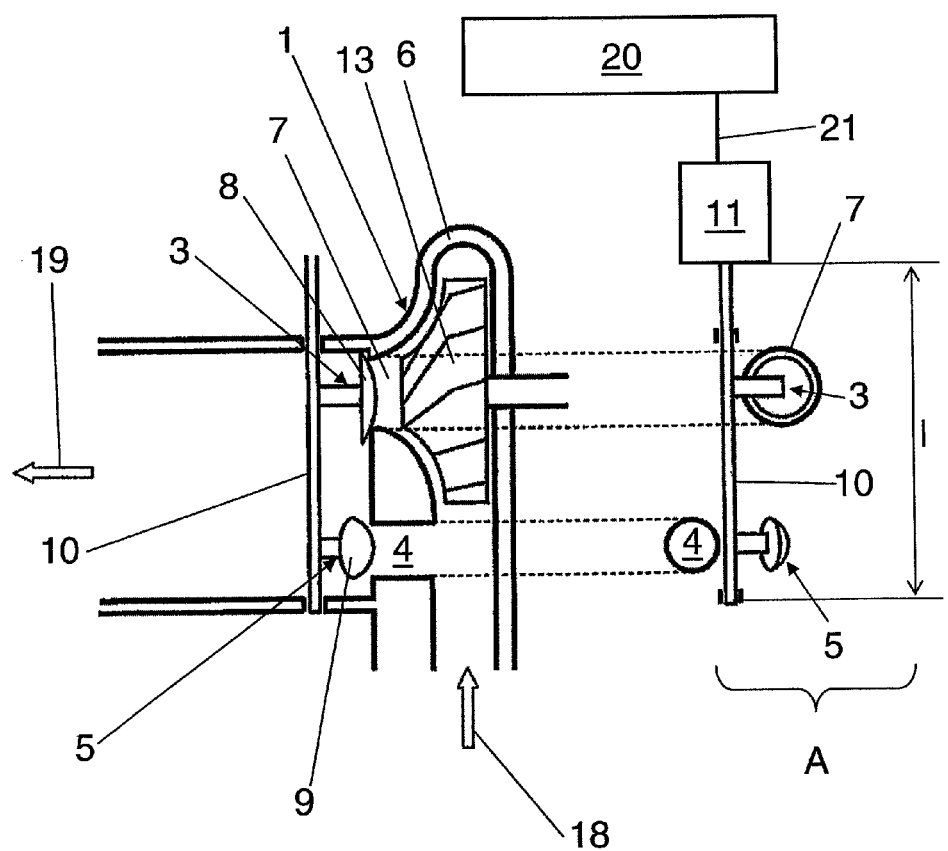
FIG. 1 shows a section through a preferred embodiment of a turbine according to the invention in a first operating mode.

Unless otherwise stated, identical components, elements and features have been provided with the same reference signs in the figures of the drawing.

FIG. 1 shows a section through a preferred embodiment of a turbine according to the invention in a first operating mode.

First of all, FIG. 1 shows a turbine 1 of an exhaust turbocharger having a turbine housing 6, a turbine rotor 13 arranged in the turbine housing 6, a turbine outlet 7 and a turbine flap 3 having a valve element 8. The turbine housing 6 furthermore has a waste gate valve 4, which is preferably designed as an aperture in the turbine housing 6. The turbine 1 furthermore has a shaft 10, on which the turbine flap 3 and a waste gate flap 5 having a valve element 9 are arranged. The valve elements 8, 9 preferably have a rounded shape, which seals off valve seats of complementary design on the turbine outlet 7 and the waste gate valve 4 in a leak-free manner in a closed state of the turbine outlet 7 or of the waste gate valve 4. The shaft 10, which is arranged in an exhaust gas flow 19 to a catalytic converter, is also referred to as a waste gate spindle. The shaft 10 is preferably rotatably mounted in the turbine housing 6, e.g. by means of heat-resistant sliding bearing locations. The shaft 10 preferably has two mutually spaced bearing locations in the turbine housing 6.

On the right, FIG. 1 furthermore shows the shaft 10 in a plan view of the waste gate valve 4 and of the turbine outlet 7. The shaft 10 is connected to an actuating means 11, which is connected to an engine controller 20 by a data line or control line 21. The actuating means 11 is preferably designed as an electric or pneumatic actuator. The actuating means 11 imparts a rotary motion to the shaft 10 either directly, via a gear mechanism or via a linkage. A desired angle of rotation of the shaft 10 can be specified by way of the engine controller 20. The turbine flap 3 and the waste gate flap 5 are mounted for conjoint rotation on the shaft 10, preferably by means of material, positive or nonpositive engagement. The turbine flap 3 and the waste gate flap 5 are arranged offset along the length 1 of the shaft 10. The turbine flap 3 and the waste gate flap 5 are furthermore also arranged offset with respect to the circumference of the shaft 10.

The turbine flap 3 is preferably arranged at the turbine outlet 7 since the waste gate spindle 10 for adjusting the waste gate flap 5 is generally already present on the same side as the turbine outlet 7. Thus, there is no need for an additional actuating means 11 for activating the turbine flap 3, i.e. the actuating means 11 already present for the purpose of moving the shaft 10 can likewise be used to adjust the turbine flap 3. If necessary, the actuating means 11 should be given somewhat larger dimensions.

The operation of the turbine 1 according to the invention in a first operating mode is described as follows:

The waste gate valve 4, which is preferably provided as an aperture in the turbine housing 6, connects an exhaust gas flow 18 from the internal combustion engine to the exhaust gas flow 19 to the catalytic converter.

In the first operating mode of the turbine 1 according to the invention, the shaft 10 is in a first position A. The shaft 10 is moved into position A by the actuating means 11. In this first operating mode, the turbine outlet 7 is completely closed by the turbine flap 3, and the waste gate valve 4 is completely opened, i.e. the waste gate flap 5 has been pivoted completely out of an exhaust gas flow flowing through the waste gate valve 4. This means that the entire exhaust gas flow 18, 19 of an internal combustion engine is directed around the turbine 1 to the catalytic converter through the waste gate valve 4.

The first operating mode is preferably set in a starting phase of the internal combustion engine. By virtue of the fact that the entire quantity of exhaust gas is directed around the turbine 1, the catalytic converter of the internal combustion engine reaches the required operating temperature thereof as quickly as possible.

Figure 2:
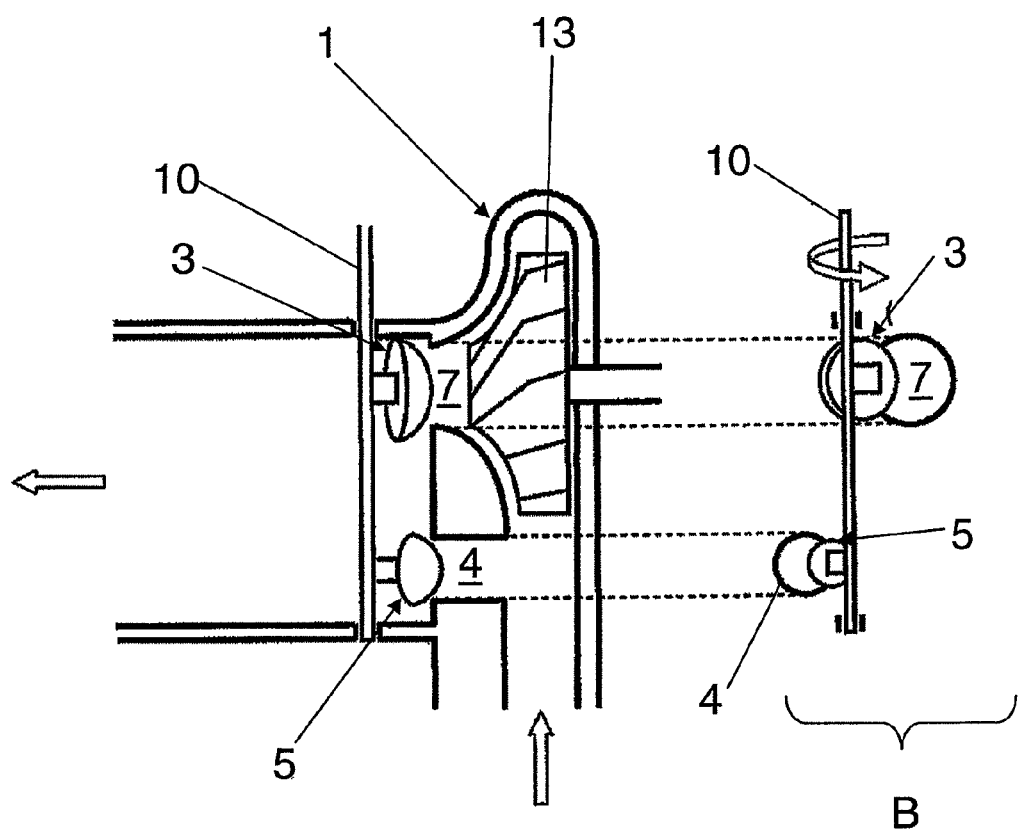
FIG. 2 shows a section through the turbine in FIG. 1 in a second operating mode.

FIG. 2 shows a section through the turbine shown in FIG. 1 in a second operating mode.

First of all, FIG. 2 shows the turbine 1 having the turbine rotor 13 and the waste gate spindle 10 having the turbine flap 3 and the waste gate flap 5. FIG. 2 furthermore shows the turbine outlet 7 and the waste gate valve 4. To simplify the illustration, the engine controller and the actuating means are not shown in FIG. 2. However, the desired angle of rotation and hence the position of the shaft 10 can once again be selected by means of the actuating means.

The operation of the turbine 1 according to the invention in a second operating mode is described below:

In the second operating mode, the waste gate spindle 10 is in a second position B. In position B, both the turbine outlet 7 and the waste gate valve 4 are at least partially opened. In this context, the term "partially opened" is intended to mean that the turbine flap 3 and the waste gate flap 5 have been pivoted at least partially into an exhaust gas flow flowing through the turbine outlet 7 and the waste gate valve 4. The second operating mode also includes positions of the waste gate spindle 10 in which the turbine flap 3 and/or the waste gate flap 5 have been pivoted completely out of the respective exhaust gas flow. This means that some of the exhaust gas is expanded in the turbine 1 in order to produce rotational energy and some flows around the turbine 1, through the waste gate valve 4, into an exhaust of the internal combustion engine.

This second operating mode is required, for example, in full load operation of the internal combustion engine at high engine speeds, e.g. when a motor vehicle is traveling quickly at a high constant speed. In this operating mode, the waste gate valve 4 prevents the rotational speed of the turbine rotor 13 from rising too far, something which might damage the turbine rotor of the exhaust turbocharger or could cause damage to the internal combustion engine due to overloading, for example.

Figure 3:
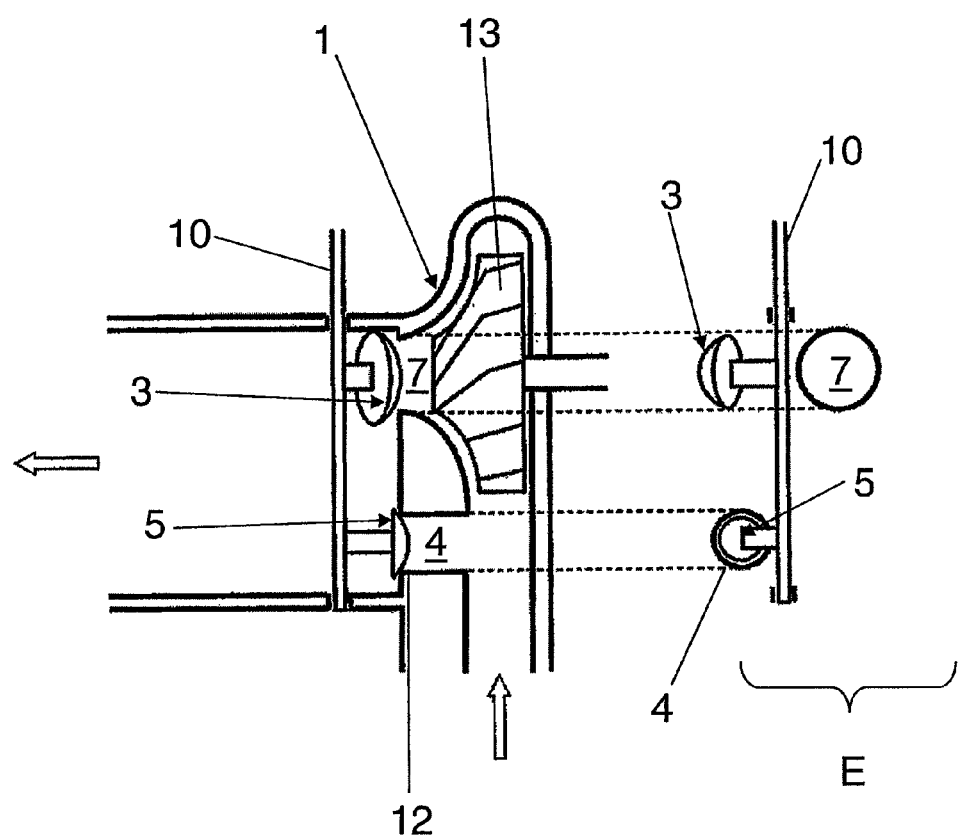
FIG. 3 shows a section through the turbine in FIG. 1 in a third operating mode.

FIG. 3 shows a section through the turbine shown in FIG. 1 in a third operating mode.

FIG. 3 once again shows the turbine 1 having the turbine rotor 13, the turbine outlet 7 and the waste gate valve 4. FIG. 3 furthermore shows the waste gate spindle 10 having the turbine flap 3 and the waste gate flap 5. To simplify the illustration, the engine controller and the actuating means are likewise not shown in FIG. 3. However, the desired angle of rotation and hence the position of the shaft 10 can once again be selected by means of the actuating means.

In the third operating mode of the turbine 1, the shaft 10 is in an end position E. The end position E represents a stop position, in which the waste gate flap 5 makes contact with the seat of the waste gate valve 4 and the waste gate flap 5 is pressed firmly against a valve seat 12 of the waste gate valve 4 in order to minimize leaks of exhaust gas. In the third operating mode, the waste gate valve 4 is consequently completely closed and the turbine outlet 7 is completely opened, as a result of which the entire quantity of exhaust gas is passed through the turbine 1 and is expanded by the turbine rotor 13 in order to produce rotational energy.

The third operating mode is required in full load operation of the internal combustion engine at low engine speeds, e.g. when starting a motor vehicle. Here, it is necessary that the entire exhaust gas flow should be expanded by the turbine rotor 13 and that no exhaust gas should bypass the turbine 1 via the waste gate valve 4.

Figure 4:
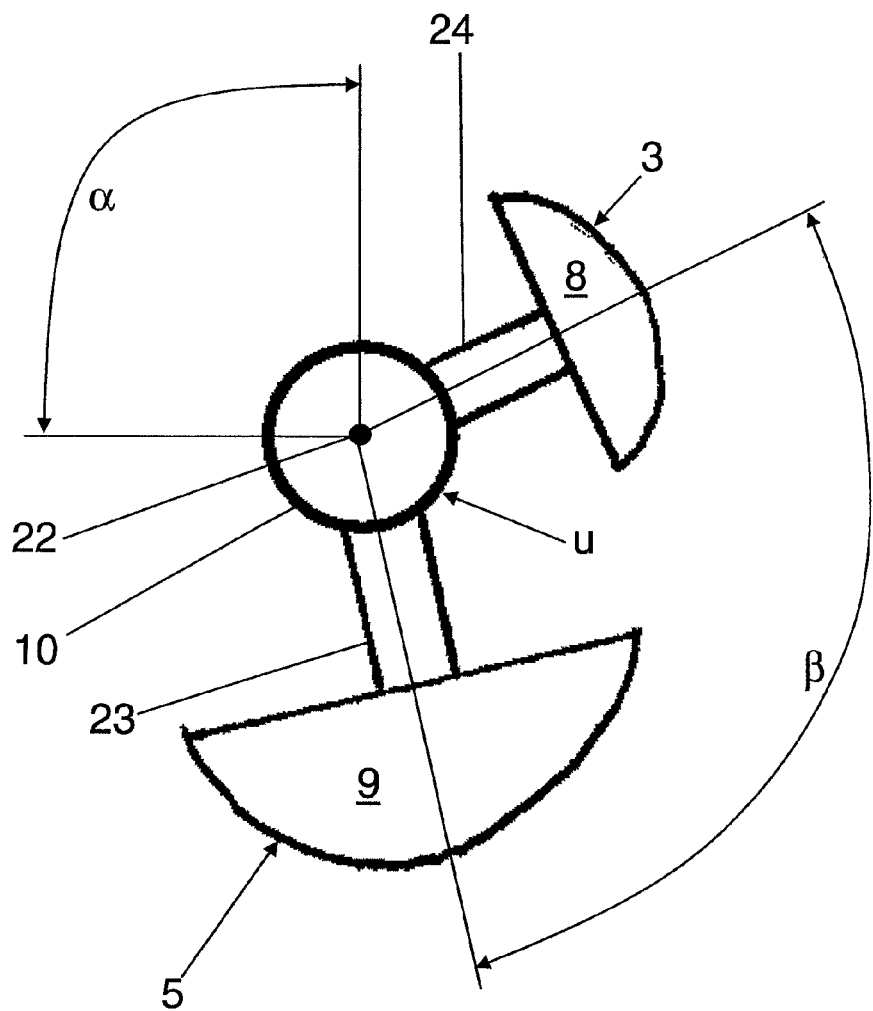
FIG. 4 shows a plan view of a preferred embodiment of a waste gate spindle of the turbine shown in FIG. 1.

FIG. 4 shows a plan view of a preferred embodiment of a waste gate spindle of the turbine shown in FIG. 1.

FIG. 4 shows the waste gate spindle 10 in a plan view onto a plane perpendicular to the plane of the paper in FIG. 1. FIG. 4 illustrates the shaft 10 having an axis of rotation 22, the turbine flap 3 having the valve element 8 and a web 24, which connects the valve element 8 to the shaft 10, and the waste gate flap 5 having the valve element 9 and a web 23, which connects the valve element 9 to the shaft 10. The joints between the valve elements 8, 9 and the webs 24, 23 are of material, positive or nonpositive design. FIG. 4 furthermore shows an angle of rotation α of the shaft 10 and an angle β, which describes the angular position of the webs 23 and 24 relative to one another on a circumference u of the shaft 10. The webs 23 and 24 are preferably connected to the shaft 10 for conjoint rotation, e.g. by means of a nonpositive joint such as a clamped joint, a positive joint such as a splined shaft joint, or a material joint such as a soldered or welded joint. The webs 23 and 24 are offset relative to one another by the angle β with respect to the circumference u. On rotation of the shaft 10 about the axis of rotation 22 thereof, said shaft moves through an angle of rotation α.

Figure 5:
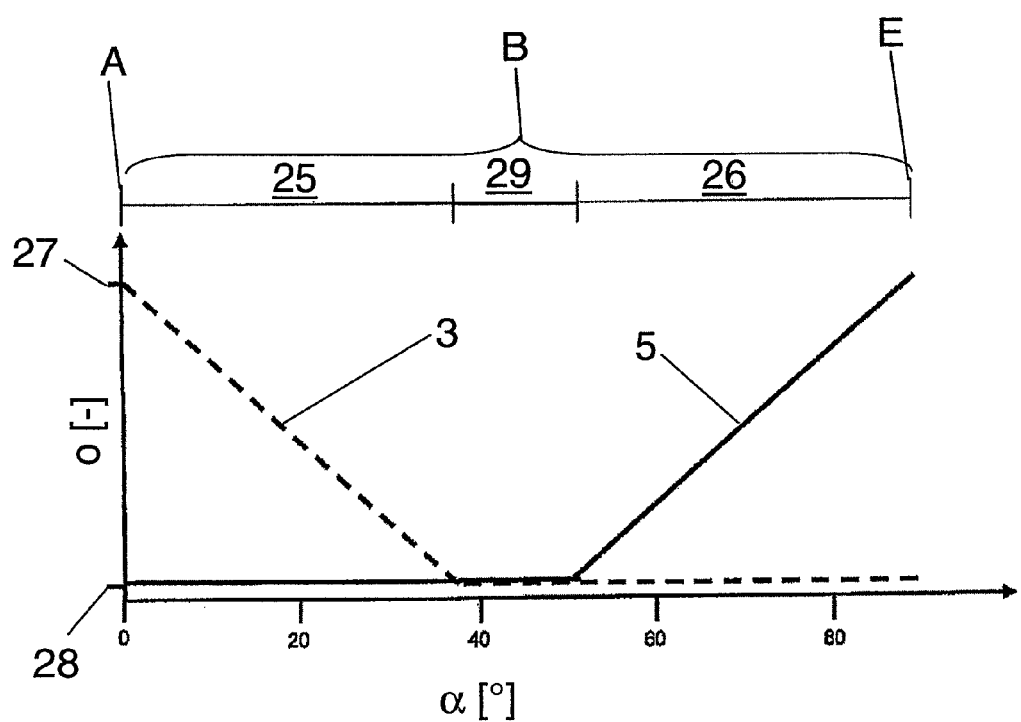
FIG. 5 shows a representation of a degree of opening of a turbine outlet and of a waste gate valve as a function of an angle of rotation of the waste gate spindle shown in FIG. 4.

FIG. 5 shows a representation of a degree of opening of a turbine outlet and of a waste gate valve as a function of an angle of rotation of the waste gate spindle shown in FIG. 4.

First of all, FIG. 5 shows a diagram in which the angle of rotation α of the waste gate spindle is plotted on the X axis of the diagram and a degree of opening o of the turbine flap 3 or of the waste gate flap 5 is plotted on the Y axis of the diagram. FIG. 5 furthermore illustrates the three positions A, B and E of the waste gate spindle, a range 25, in which the turbine outlet opens and a range 26, in which the waste gate valve closes. In FIG. 5, reference sign 27 denotes a completely closed turbine flap 3 or a completely closed waste gate flap 5, and reference sign 28 denotes a completely opened turbine flap 3 or a completely opened waste gate flap 5. Reference sign 29 denotes an angular range of the angle of rotation α in which both the waste gate valve 5 and the turbine flap 3 are completely opened.

In position A of the waste gate spindle, which corresponds to the first operating mode of an exhaust turbocharger having a turbine according to the invention, the turbine flap 3 is initially completely closed and the waste gate flap 5 is completely opened. When the waste gate spindle is rotated through the angle α, the turbine flap 3 begins to open increasingly in range 25, and the waste gate flap 5 initially remains completely opened in this range 25. There is preferably a linear relationship between the degree of opening o of the turbine flap 3 and the angle of rotation α. In range 29, which includes an angular range of the angle of rotation α of about 40° to 50°, for example, both the waste gate flap 5 and the turbine flap 3 are completely opened. When the waste gate spindle is rotated further, the waste gate valve begins to close increasingly in range 26, while the turbine flap 3 remains completely opened. The relationship between the degree of opening o of the waste gate flap 5 and the angle of rotation α is preferably linear. Position B of the waste gate spindle corresponds to the second operating mode of the exhaust turbocharger. In contrast to position A, which corresponds to an angle of rotation α of 0°, for example, position B of the waste gate spindle covers an angular range of the angle of rotation α of 0° to 90°, for example. Finally, in the end position E of the waste gate spindle, which corresponds to the third operating mode of the exhaust turbocharger, the turbine flap 3 is completely opened and the waste gate flap 5 is completely closed. As soon as the waste gate valve is completely closed, the rotary motion of the waste gate spindle stops since the valve element of the waste gate flap 5 makes contact with the valve seat of the waste gate valve. In order to minimize leaks of exhaust gas in full load operation of the internal combustion engine at low engine speeds, the valve element of the waste gate flap 5 must in this case be pressed firmly and preferably positively against the valve seat of the waste gate valve.

Figure 6:
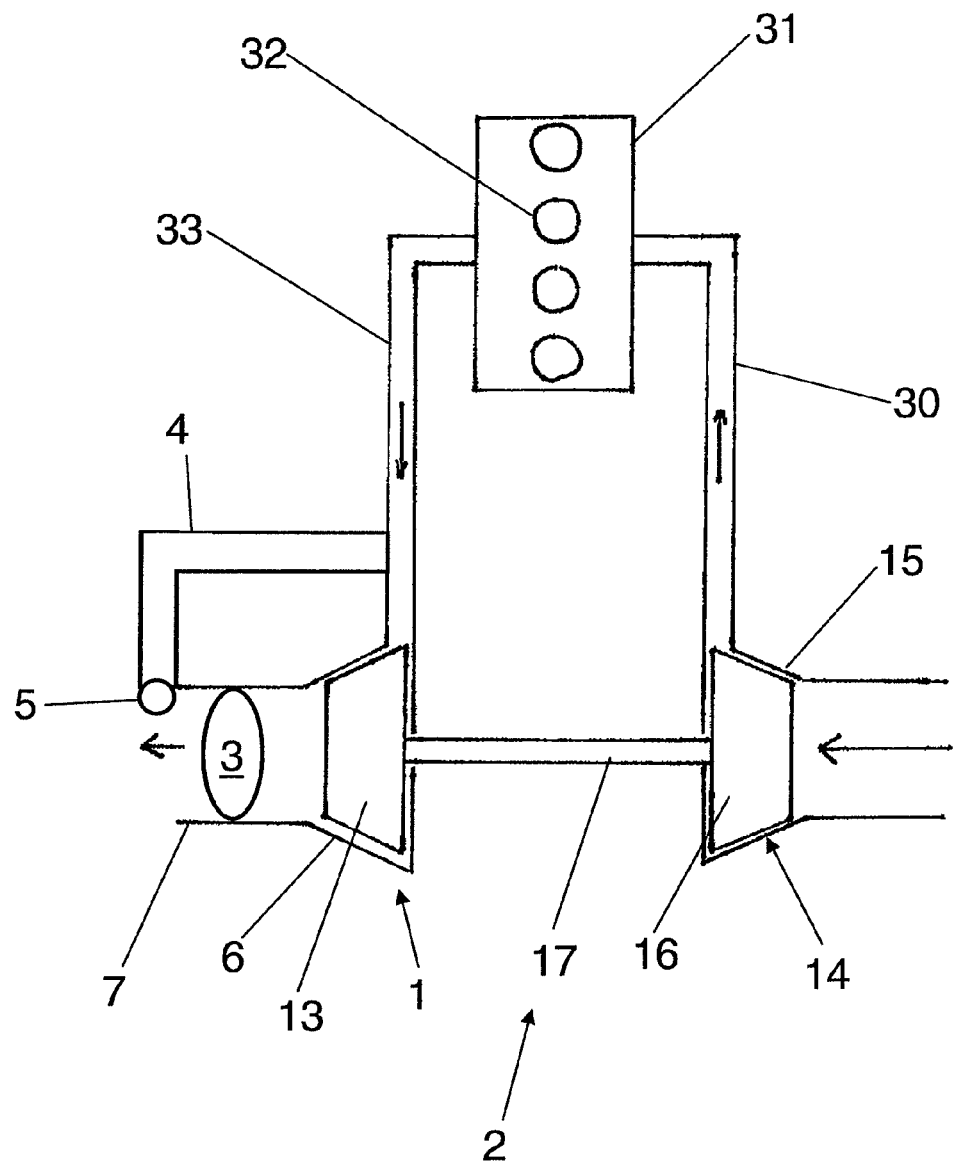
FIG. 6 shows a diagrammatic view of a preferred embodiment of an exhaust turbocharger according to the invention having a turbine shown in FIG. 1.

FIG. 6 shows a diagrammatic view of a preferred embodiment of an exhaust turbocharger according to the invention having a turbine shown in FIG. 1.

An internal combustion engine 31 having a plurality of cylinders 32 is coupled in terms of fluid flow by an exhaust line 33 to the turbine rotor 13 of the turbine 1, said rotor being arranged in the turbine housing 6. The turbine flap 3 is arranged in the turbine outlet 7 of the turbine 1. The waste gate valve 4 having the waste gate flap 5 forms a bypass around the turbine 1 for the exhaust gas. The turbine rotor 13 is connected to a compressor impeller 16 for conjoint rotation by a turbocharger shaft 17. The compressor impeller 16 is arranged in a compressor housing 15 of a compressor 14 of an exhaust gas turbocharger 2. The compressor impeller 16 is coupled to the internal combustion engine 31 in terms of fluid flow by an intake section 30.

During the operation of the internal combustion engine 31 having the exhaust turbocharger 2, the internal combustion engine 31 supplies the turbine rotor 13 with exhaust gas via the exhaust line 33. The turbine rotor 13 lowers the enthalpy of the exhaust gas, and the kinetic and thermal energy of the exhaust gas is converted into rotational energy. The rotational energy is transmitted to the compressor impeller 16 by the turbocharger shaft 17. The compressor impeller 16 draws in fresh air, compresses it and feeds the compressed fresh air to the internal combustion engine 31 via the intake section 30. By virtue of the fact that there is more oxygen in the compressed air volume per unit volume, more fuel can be burnt in the internal combustion engine 31 per unit of air volume, thereby increasing the power output of the internal combustion engine 31. Depending on the operating state of the internal combustion engine 31, exhaust gas can be directed past the turbine 1 by means of the waste gate valve 4, or the turbine outlet 7 can be closed by means of the turbine flap 3.

In a first operating mode of the exhaust turbocharger 2 according to the invention, the turbine outlet 7 is completely closed and the waste gate flap 5 is completely opened, i.e. the entire quantity of exhaust gas is directed around the turbine 1. This operating mode is required when starting the internal combustion engine 31 in order to bring a catalytic converter as quickly as possible to the required operating temperature thereof.

In a second operating mode of the exhaust turbocharger 2 according to the invention, both the turbine flap 3 and the waste gate flap 5 are at least partially opened. This second operating mode is achieved, for example, in the case where a motor vehicle is traveling rapidly at a constant speed and the internal combustion engine 31 is at a high engine speed. At least partially opening the waste gate flap 5 prevents the turbine 1 from being supplied with an excessive quantity of exhaust gas when the internal combustion engine 31 is at full load, something which could increase the rotational speed of the turbine rotor 13 and hence the rotational speed of the compressor impeller 16 to such an extent that either the turbine rotor 13 or even the internal combustion engine 31 could be damaged by excessive boosting.

In a third operating mode of the exhaust turbocharger 2 according to the invention, the waste gate flap 5 is completely closed, and the turbine flap 3 is completely opened. This operating mode is required, for example, when starting the motor vehicle. In this case, the entire quantity of exhaust gas is passed through the turbine 1, thereby ensuring that a sufficient engine power is achieved even at low engine speeds and full engine load.

Although the present invention has been fully described by means of preferred embodiments, it is not restricted thereto but can be modified in many different ways. In particular, features of the individual embodiments described above can be combined in any desired manner insofar as this is technically reasonable.

In a preferred modification of the present invention, the turbine flap is not arranged at the turbine outlet of the turbine but at a turbine inlet of the turbine. In this design embodiment, two actuating means are then required, although, as a result, the degrees of opening of the turbine flap and of the waste gate flap can be adjusted completely independently of one another through the absence of mechanical coupling.

The materials, numerical data and dimensions presented are to be taken as illustrative and serve merely to explain the embodiments and developments of the present invention.

The indicated turbine and exhaust turbocharger having a turbine can be used to particular advantage in the motor vehicle sector and, in this sector, can preferably be used for passenger vehicles, e.g. with diesel or spark ignition engines, but can also be used in any other turbocharger applications having a waste gate, if required.

The invention claimed is:

1. A turbine for an exhaust gas turbocharger, the turbine comprising:
   a turbine flap disposed at a turbine outlet for controlling a quantity of exhaust gas flowing through the turbine;
   a waste gate aperture for allowing exhaust gas to bypass the turbine; and
   a waste gate flap for controlling a quantity of exhaust gas flowing through said waste gate aperture;
   said turbine flap and said waste gate flap being disposed on a common waste gate spindle and connected for conjoint rotation, said turbine flap and said waste gate flap being disposed offset relative to one another in a longitudinal direction and a circumferential direction of said spindle;
   said turbine flap and said waste gate flap having rounded valve elements configured for respectively pivoting into exhaust gas flow flowing through said turbine outlet and said waste gate aperture by rotation of said waste gate spindle and wherein there is a linear relationship between a degree of opening of said turbine outlet and an angle of rotation of said spindle and there is a linear relationship between a degree of opening of said waste gate aperture and an angle of rotation of said spindle.

2. The turbine according to claim 1, which comprises a turbine housing, wherein said waste gate aperture is formed in said turbine housing and wherein said turbine flap and said waste gate flap are disposed in the turbine housing.

3. The turbine according to claim 1, which comprises an actuating means for rotating said spindle.

4. The turbine according to claim 1, wherein said spindle is disposed for rotation into a first position, in which the turbine outlet is completely closed and in which said waste gate aperture is completely open.

5. The turbine according to claim 1, wherein said spindle is disposed for rotation into a second position, in which the turbine outlet is at least partially open and in which said waste gate aperture is at least partially open.

6. The turbine according to claim 1, wherein said spindle is disposed for rotation into an end position, in which the turbine outlet is completely open and in which said waste gate aperture is completely closed, wherein said waste gate flap is pressed against a valve seat of said waste gate aperture to prevent leaks of exhaust gas in the end position.

7. The turbine according to claim 1, wherein said spindle is disposed for rotation into a first position, in which the turbine outlet is completely closed and in which said waste gate aperture is completely open, into a second position, in which the turbine outlet is at least partially open and in which said waste gate aperture is at least partially open, and into an end position, in which the turbine outlet is completely open and in which said waste gate aperture is completely closed, wherein said waste gate flap is pressed against a valve seat of said waste gate aperture to prevent leaks of exhaust gas in the end position.

8. The turbine according to claim 1 configured for an exhaust gas turbocharger of a motor vehicle.

9. An exhaust turbocharger, comprising:
   a turbine according to claim 1, said turbine having:
      a turbine housing and a turbine rotor arranged in said turbine housing;
      a compressor having a compressor housing;
      a compressor impeller disposed in said compressor housing; and
      a turbocharger shaft connecting said compressor impeller to said turbine rotor for conjoint rotation.

10. A motor vehicle, comprising a turbine for an exhaust turbocharger according to claim 6.

11. A method of operating an exhaust turbocharger, the method which comprises:
    providing the exhaust turbocharger with a turbine according to claim 1;
    operating the turbine in a first operating mode, in which the turbine flap is completely closed and in which the waste gate flap is completely opened, in order to cause an entire quantity of exhaust gas to flow through the waste gate aperture.

12. The method according to claim 11, which comprises operating the turbine in a second operating mode, in which the turbine flap and the waste gate flap are at least partially opened, in order to cause a quantity of exhaust gas to flow partially through the turbine and partially through the waste gate aperture.

13. The method according to claim 11, which comprises operating the turbine in a third operating mode, in which the turbine flap is completely opened and in which the waste gate flap is completely closed, to cause an entire quantity of exhaust gas to flow through the turbine.

* * * * *